(12) United States Patent
Chisholm

(10) Patent No.: US 8,120,484 B2
(45) Date of Patent: Feb. 21, 2012

(54) CLOSURE AND PACKAGE WITH RFID KERNEL TAG AND BOOST ANTENNA

(75) Inventor: Brian J. Chisholm, Sylvania, OH (US)

(73) Assignee: Rexam Healthcare Packaging Inc., Perrysburg, OH (US)

( * ) Notice: Subject to any disclaimer, the term of this patent is extended or adjusted under 35 U.S.C. 154(b) by 422 days.

(21) Appl. No.: 11/818,364

(22) Filed: Jun. 14, 2007

(65) Prior Publication Data

US 2008/0309495 A1  Dec. 18, 2008

(51) Int. Cl.
*H04Q 5/22* (2006.01)
*G08B 1/08* (2006.01)
*A61J 1/00* (2006.01)
*B65D 51/24* (2006.01)
*H04B 5/00* (2006.01)

(52) U.S. Cl. ............... 340/572.1; 340/10.1; 340/539.11; 215/201; 215/302; 455/41.1; 455/41.2

(58) Field of Classification Search .................. None
See application file for complete search history.

(56) References Cited

U.S. PATENT DOCUMENTS

| | | | |
|---|---|---|---|
| 2,788,048 A | 4/1957 | Kimes | |
| 3,694,609 A * | 9/1972 | Kennedy | ........................ 219/633 |
| 3,919,374 A | 11/1975 | Komendowski | |
| 4,572,856 A | 2/1986 | Gembinski | |
| 4,708,630 A | 11/1987 | Hammond | |
| 4,813,564 A | 3/1989 | Cooper et al. | |
| 4,988,472 A | 1/1991 | Orimoto et al. | |
| 5,566,441 A | 10/1996 | Marsh et al. | |
| 6,226,619 B1 | 5/2001 | Halperin et al. | |
| 6,251,323 B1 | 6/2001 | Hoedl et al. | |
| 6,259,369 B1 | 7/2001 | Monico | |
| 6,268,037 B1 | 7/2001 | Butler et al. | |
| 6,634,564 B2 * | 10/2003 | Kuramochi | ................... 235/492 |
| 6,641,052 B2 | 11/2003 | Baillod et al. | |
| 6,646,554 B1 | 11/2003 | Goff et al. | |

(Continued)

FOREIGN PATENT DOCUMENTS

DE  9417863 U1  1/1995

(Continued)

OTHER PUBLICATIONS

PCT Notification, Search Report and Written Opinion Date: Aug. 26, 2008 12 pgs.

(Continued)

*Primary Examiner* — Jennifer Mehmood
*Assistant Examiner* — Fekadeselassie Girma
(74) *Attorney, Agent, or Firm* — Reising Ethington P.C.

(57) ABSTRACT

A closure includes a plastic shell for securement to a container neck finish. An RFID kernel tag is disposed within the shell, and includes an RFID circuit and a low power UHF antenna coupled to the circuit. A boost antenna, electromagnetically coupled to but otherwise disconnected from the RFID kernel tag, boosts signal gain to and from the RFID kernel tag. In several exemplary embodiments of the disclosure, the RFID kernel tag is secured to an undersurface of the base wall of the closure, and the boost antenna is disposed on the undersurface of the closure base wall, on an opposing surface of a liner disk disposed within the closure shell or comprises a metal layer on an induction seal disk secured to the end of the container neck finish.

9 Claims, 2 Drawing Sheets

U.S. PATENT DOCUMENTS

| | | | |
|---|---|---|---|
| 6,724,308 B2 * | 4/2004 | Nicholson | 340/572.1 |
| 6,782,601 B2 | 8/2004 | Smeyak et al. | |
| 6,859,745 B2 | 2/2005 | Carr et al. | |
| 7,040,139 B2 | 5/2006 | Sunshine | |
| 7,048,179 B2 | 5/2006 | Claessens et al. | |
| 7,070,053 B1 | 7/2006 | Abrams et al. | |
| 7,176,796 B2 | 2/2007 | Chen et al. | |
| 7,342,501 B2 * | 3/2008 | Abbott | 340/572.8 |
| 7,388,506 B2 * | 6/2008 | Abbott | 340/572.8 |
| 7,479,887 B2 * | 1/2009 | Meyer | 340/572.8 |
| 2002/0183883 A1 | 12/2002 | Carr et al. | |
| 2002/0185544 A1 | 12/2002 | Baillod et al. | |
| 2003/0061705 A1 | 4/2003 | Smeyak et al. | |
| 2003/0061706 A1 | 4/2003 | Smeyak et al. | |
| 2003/0235027 A1 * | 12/2003 | Smeyak et al. | 340/572.8 |
| 2004/0008123 A1 | 1/2004 | Carrender et al. | |
| 2004/0238623 A1 | 12/2004 | Asp | |
| 2005/0068182 A1 | 3/2005 | Dunlap et al. | |
| 2005/0093678 A1 | 5/2005 | Forster et al. | |
| 2005/0127155 A1 | 6/2005 | Claessens et al. | |
| 2005/0162277 A1 | 7/2005 | Teplitxky et al. | |
| 2005/0190070 A1 | 9/2005 | Rudduck et al. | |
| 2005/0263524 A1 | 12/2005 | Meynier | |
| 2006/0038683 A1 | 2/2006 | Claessens et al. | |
| 2006/0049948 A1 | 3/2006 | Chen et al. | |
| 2006/0076419 A1 | 4/2006 | Johnson | |
| 2006/0152364 A1 * | 7/2006 | Walton | 340/568.1 |
| 2006/0180650 A1 * | 8/2006 | Claessens et al. | 235/375 |
| 2006/0255953 A1 | 11/2006 | Lyon et al. | |
| 2007/0007228 A1 * | 1/2007 | Weed | 215/230 |
| 2007/0051691 A1 | 3/2007 | Hidding | |
| 2007/0063895 A1 * | 3/2007 | August et al. | 342/359 |
| 2007/0182562 A1 | 8/2007 | Abbott et al. | |
| 2007/0229281 A1 * | 10/2007 | Shionoiri et al. | 340/572.7 |
| 2008/0068178 A1 | 3/2008 | Meyer | |
| 2008/0088448 A1 * | 4/2008 | Steidinger | 340/572.1 |
| 2008/0129514 A1 | 6/2008 | Chisholm | |
| 2008/0131629 A1 | 6/2008 | Chisholm | |
| 2008/0149584 A1 * | 6/2008 | Martinelli | 215/201 |
| 2008/0238675 A1 * | 10/2008 | Yang | 340/572.1 |

FOREIGN PATENT DOCUMENTS

| | | |
|---|---|---|
| DE | 20105605 U1 | 6/2001 |
| DE | 10010900 A1 | 9/2001 |
| DE | 20214099 U1 | 1/2003 |
| EP | 0408217 A1 | 1/1991 |
| EP | 0399316 B1 | 5/1993 |
| EP | 0619243 A1 | 10/1994 |
| EP | 2288103 A | 10/1995 |
| EP | 0782214 A1 | 12/1995 |
| EP | 0586083 A2 | 3/2004 |
| EP | 1491317 A1 | 12/2004 |
| JP | 2002183690 | 6/2002 |
| JP | 2004253858 | 9/2004 |
| JP | 2006062716 | 3/2006 |
| JP | 2006302219 | 11/2006 |
| WO | WO 93/24381 | 12/1993 |
| WO | WO 93/24381 A1 | 12/1993 |
| WO | WO 97/38364 A1 | 10/1997 |
| WO | WO 03/023705 A1 | 3/2003 |
| WO | WO 03/060818 A2 | 7/2003 |
| WO | WO 2005/024745 A2 | 3/2005 |
| WO | WO 2005/040001 A1 | 5/2005 |
| WO | WO 2005/081182 A2 | 9/2005 |
| WO | 2006016184 A2 | 2/2006 |
| WO | WO 2006/016184 A2 | 2/2006 |
| WO | WO 2006/039461 A2 | 4/2006 |

OTHER PUBLICATIONS

PCT/US2007/00817—Search Report, Written Opinion, and Preliminary Report, 23 pages, Pub. Date Aug. 16, 2007.

PCT/US2007/000868—Notification, Search Report, Written Opinion, and Preliminary Report—30 pages, Pub. Date Aug. 16, 2007.

PCT/US2007/000967—Notification, Search Report, Written Opinion and Preliminary Report—24 pages, Pub. Date Aug. 16, 2007.

PCT/US2007/016116—Notification, Search Report, Written Opinion and Preliminary Report—21 pages, Pub. Date Mar. 13, 2008.

PCT/US2007/016285—Notification, Search Report, Written Opinion and Preliminary Report—35 pages, Pub. Date Jun. 12, 2008.

PCT/US2007/016393—Notification, Search Report, Written Opinion and Preliminary Report—30 pages, Pub. Date Jun. 12, 2008.

International Search Report and Written Opinion for International Application No. PCT/US2007/016282, Mailing Date Feb. 19, 2009, 23 pages.

PCT International Preliminary Report on Patentability for International Application No. PCT/US2008/066428, International Filing date Jun. 10, 2008, 9 pages.

Collins, Jonathan, "Rafsec Debuts Packaging RFID Tag" Article, Sep. 18, 2003, RFID Journal, webpage, www.rfidjournal.com/article.

Drobny, "Handbook of Thermoplastic Elastomers", "4: Processing Methods Applicable to Thermoplastic Elastomers" excerpt, pp. 102-103, Copyright 2007 by William Andrew.

* cited by examiner

CLOSURE AND PACKAGE WITH RFID KERNEL TAG AND BOOST ANTENNA

The present disclosure relates to placement of a radio frequency identification (RFID) tag in a package to identify or confirm the genuineness of the package, and more particularly to use of inexpensive UHF RFID kernel tags in closures and packages.

BACKGROUND AND SUMMARY OF THE DISCLOSURE

It has been proposed to place a high frequency (HF) RFID tag and antenna in a package to identify the package or to confirm the genuineness of the package. The RFID tag and antenna can be placed, for example, on an undersurface of a closure applied to a container to form the package. Ultra high frequency (UHF) RFID kernel tags include an RFID circuit and a low power UHF antenna. However, such UHF RFID kernel tags require a boost antenna for efficient and reliable communication with external circuitry. A general object of the present disclosure is to provide a closure and a package that address this need in the art.

The present disclosure embodies a number of aspects that can be implemented separately from or in combination with each other.

A closure in accordance with a first aspect of the present disclosure includes a plastic shell for securement to a container neck finish. An RFID kernel tag is disposed within the shell, and includes an RFID circuit and a low power UHF antenna coupled to the circuit. A boost antenna, electromagnetically coupled to but otherwise disconnected from the RFID kernel tag, boosts signal gain to and from the RFID kernel tag. In several exemplary embodiments of the disclosure, the RFID kernel tag is secured to an undersurface of the base wall of the closure, and the boost antenna is disposed on the undersurface of the closure base wall, on an opposing surface of a liner disk disposed within the closure shell or comprises a metal layer on an induction seal disk secured to the end of the container neck finish.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

Figure 1:
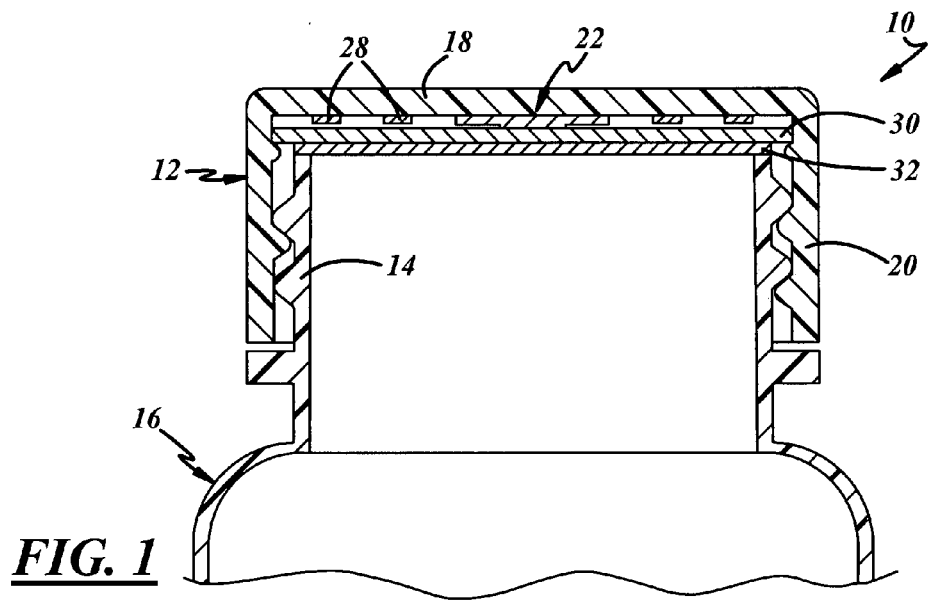
FIG. 1 is a fragmentary sectional view of a package in accordance with an exemplary embodiment of the present disclosure.
Figure 2:
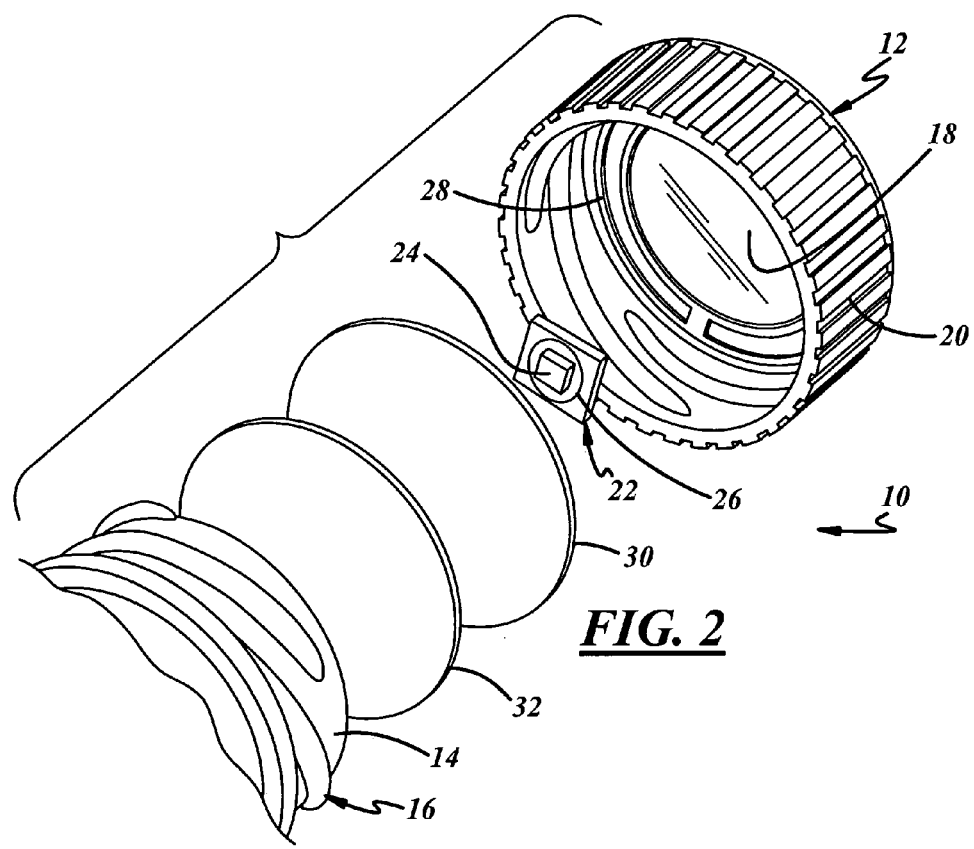
FIG. 2 is a fragmentary exploded perspective view of the package in FIG. 1.

FIGS. 1-2 illustrate a package 10 in accordance with an exemplary embodiment of the present disclosure as including a closure 12 applied to the neck finish 14 of a container 16. Container 16, including neck finish 14, preferably is of plastic construction and can be of any desired geometry, with the geometry illustrated in FIG. 1 being exemplary only. Closure 12 preferably includes a plastic shell having a base wall 18 and a skirt 20 for securing closure 12 to container neck finish 14.

A UHF RFID kernel tag 22 is disposed within closure 12. RFID kernel tag 22 includes an RFID circuit 24 (FIG. 2) connected to a low power UHF antenna 26. A boost antenna is provided in accordance with the present disclosure for boosting signal gain to and from RFID kernel tag 22. In the embodiment of FIGS. 1 and 2, the boost antenna 28 is annular and is disposed on the undersurface of closure shell base wall 18 surrounding RFID kernel tag 22. Antenna 28 can be of any suitable configuration, and can be separately fabricated and adhered to the undersurface of closure shell base wall 18, or more preferably is printed on the undersurface of the closure shell base wall using electrically conductive ink for example. Boost antenna 28 is electromagnetically coupled to but otherwise disconnected from RFID kernel tag 22 and boosts signal gain between the RFID kernel tag and external interrogation circuitry.

Exemplary package 10 in FIGS. 1 and 2 also may include a liner disk 30 captured by the closure shell for sealing engagement with the opposing end of container neck finish 14, and/or a sealing disk 32 induction or conduction welded to the end surface of container neck finish 14 both to seal the package prior to use and to provide indication that the package has been opened. RFID kernel tag 28 preferably is adhered or otherwise secured to the undersurface of closure shell base wall 18 within skirt. Where a liner disk 30 is employed, RFID kernel tag 28 can less preferably be loosely captured between disk 30 and base wall 18, or can be secured to the surface of liner disk 30 opposed to base wall 18.

Figure 3:
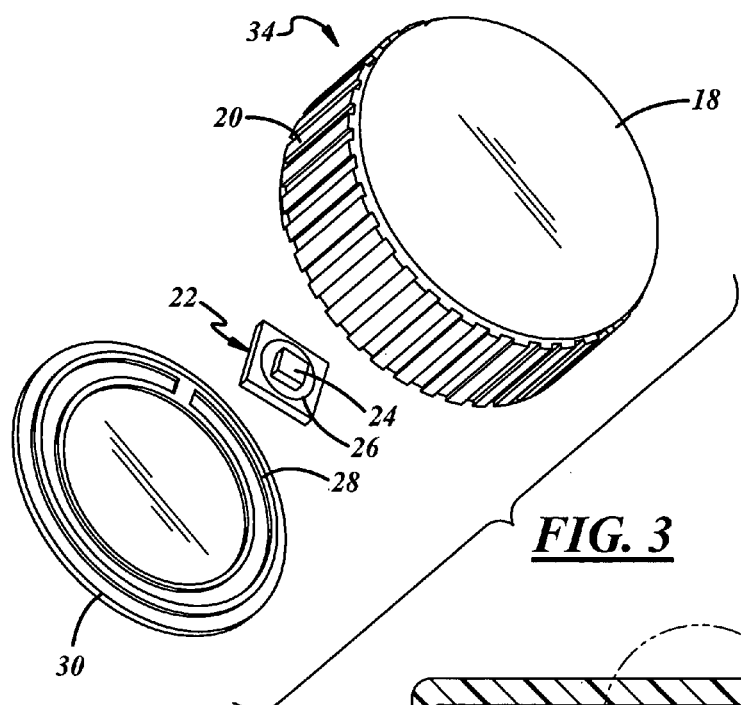
FIG. 3 is an exploded perspective view of a closure in accordance with another exemplary embodiment of the present disclosure.

FIG. 3 illustrates an alternative exemplary embodiment of a closure 34 in accordance with the present disclosure. The closure shell includes base wall 18 and skirt 20 as in the embodiment of FIGS. 1 and 2. However, boost antenna 28 is provided on the surface of liner disk 30 opposed in assembly to closure shell base wall 18. RFID kernel tag 22 can be secured to the closure shell base wall as in the embodiment of FIGS. 1-2, or can be secured to the opposing surface of liner disk 30 within boost antenna 28. Inasmuch as boost antenna 28 and RFID kernel tag 22 remain with closure 12 in either of the embodiments of FIGS. 1-2 and 3, the package can be interrogated even after the package has been opened as long as the closure is applied to the container neck finish.

Figure 4:
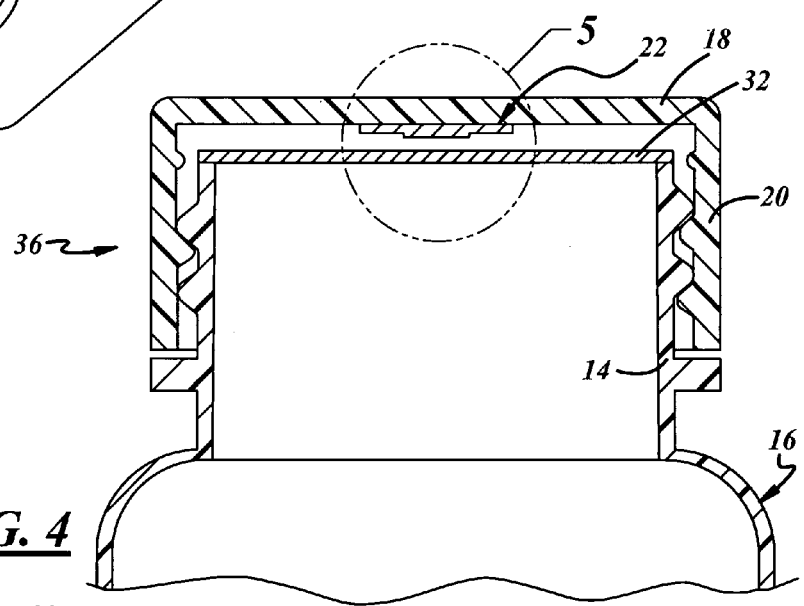
FIG. 4 is a fragmentary sectional view of a package in accordance with a further exemplary embodiment of the present disclosure.
Figure 5:
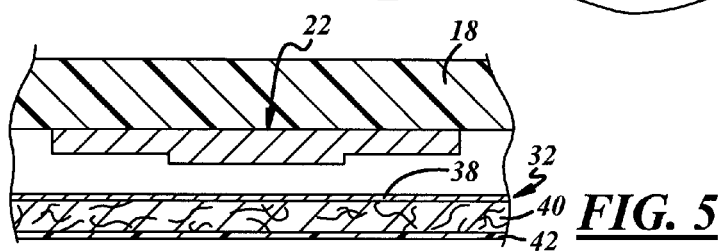
FIG. 5 is a sectional view on an enlarged scale of the portion of FIG. 4 within the area 5.

FIGS. 4-5 illustrate a package 36 in which RFID kernel tag 22 is secured to the undersurface of closure shell base wall 18 as in the embodiment of FIGS. 1-2. However, the boost antenna is formed by a metal layer 38 on the opposing surface of seal disk 32. The seal disk includes a layer 40 such as paper and a layer 42 of meltable plastic. After seal disk 32 has been placed in engagement with the end surface of the container neck finish, electrical energy is applied through metal layer 38 to melt a portion of layer 42 and weld seal disk 32 to neck finish 14. To obtain access to the product within container 16, seal disk 32 must be torn or otherwise removed from the package. Thus, in this embodiment, the boost antenna provided by metal layer 38 is destroyed when the package is opened so that RFID kernel tag 22 in this embodiment no longer can be interrogated by external circuitry after the package has been opened. Package 36 can include a liner disk 30 (FIGS. 1 and 2) if desired.

There thus have been disclosed a closure and a package that fully satisfy all of the objects and aims previously set forth. The disclosure has been presented in conjunction with several exemplary embodiments, and additional modifications and variations have been discussed. Other modifications and variations readily will suggest themselves to persons of ordinary skill in the art in view of the foregoing description. The disclosure is intended to embrace all such modifications and variations as fall within the spirit and broad scope of the appended claims.

The invention claimed is:

1. A closure that includes:
a plastic shell for securement to a container neck finish,
an RFID kernel tag disposed within said shell, including an RFID circuit and a low power UHF antenna coupled to said circuit,
a boost antenna electromagnetically coupled to but otherwise disconnected from said RFID kernel tag, for boosting signal gain to and from said RFID kernel tag, wherein said boost antenna is annular and surrounds said low power UHF antenna of said RFID kernel tag; and
a liner disk captured within said shell and sealingly engageable with an end of the container neck finish, wherein said RFID kernel tag is disposed between said closure shell and said liner disk, and said boost antenna is disposed on said liner disk,
wherein said RFID kernel tag is loosely captured between said liner disk and a base wall of said closure shell.

2. A closure that includes:
a plastic shell for securement to a container neck finish,
an RFID kernel tag disposed within said shell, including an RFID circuit and a low power UHF antenna coupled to said circuit,
a boost antenna electromagnetically coupled to but otherwise disconnected from said RFID kernel tag, for boosting signal gain to and from said RFID kernel tag, and
a seal disk within said closure shell including a meltable plastic layer for induction or conduction welding to a container neck finish, and also including a metal layer but not including another layer connecting said metal layer to said plastic shell, and wherein said boost antenna comprises said metal layer on said seal disk.

3. A package that includes:
a container having a neck finish,
a closure shell having a base wall and a skirt secured to said neck finish,
an RFID kernel tag disposed within said closure shell, including an RFID circuit and a low power UHF antenna coupled to said circuit,
a boost antenna within said closure, electromagnetically coupled to but otherwise disconnected from said RFID kernel tag, for boosting signal gain to and from said RFID kernel tag, wherein said boost antenna is annular and surrounds said low power UHF antenna of said RFID kernel tag, and
a liner disk captured within said closure shell between said base wall and said neck finish, and wherein said RFID kernel tag is disposed between said closure shell base wall and said liner disk, and said boost antenna is disposed on said liner disk,
wherein said RFID kernel tag is loosely captured between said liner disk and a base wall of said closure shell.

4. A package that includes:
a container having a neck finish,
a closure shell having a base wall and a skirt secured to said neck finish,
an RFID kernel tag disposed within said closure shell, including an RFID circuit and a low power UHF antenna coupled to said circuit,
a boost antenna within said closure, electromagnetically coupled to but otherwise disconnected from said RFID kernel tag, for boosting signal gain to and from said RFID kernel tag, and
a seal disk including a meltable plastic layer welded to an end of said neck finish beneath said closure shell and also including a metal layer but not including another layer connecting said metal layer to said plastic shell, said boost antenna comprising said metal layer on said seal disk.

5. A closure that includes:
a plastic closure shell for securement to a container neck finish, and having a base wall and a skirt secured to said neck finish,
a liner disk captured within said shell and sealingly engageable with an end of the container neck finish,
an RFID kernel tag loosely captured between said liner disk and a base wall of said closure shell, and including an RFID circuit and a low power UI-IF antenna coupled to said circuit, and
a boost antenna is disposed within said closure, electromagnetically coupled to but otherwise electrically disconnected from said RFID kernel tag, for boosting signal gain to and from said RFID kernel tag; wherein the boost antenna is disposed within the skirt of the closure.

6. The closure set forth in claim 5 wherein said boost antenna is disposed on said liner disk.

7. A closure that includes:
a plastic shell for securement to a container neck finish, wherein the plastic shell has a base wall and a skirt,
an RFID kernel tag disposed within said shell, including an RFID circuit and a low power UI-IF antenna coupled to said circuit,
a boost antenna disposed within the skirt of the closure, electromagnetically coupled to but otherwise disconnected from said RFID kernel tag, for boosting signal gain to and from said RFID kernel tag, wherein said boost antenna is annular and surrounds said low power UHF antenna of said RFID kernel tag; and
a liner disk captured within said shell and sealingly engageable with an end of the container neck finish, wherein said RFID kernel tag is secured to said liner disk.

8. The closure set forth in claim 7 wherein said boost antenna is disposed on said liner disk.

9. A closure that includes:
a plastic shell for securement to a container neck finish,
an RFID kernel tag disposed within said shell, including an RFID circuit and a low power UHF antenna coupled to said circuit,
a boost antenna electromagnetically coupled to but otherwise disconnected from said RFID kernel tag, for boosting signal gain to and from said RFID kernel tag, wherein said boost antenna is annular and surrounds said low power UHF antenna of said RFID kernel tag; and
a liner disk captured within said shell and sealingly engageable with an end of the container neck finish, wherein said RFID kernel tag is disposed between said closure shell and said liner disk, and said boost antenna is disposed on said liner disk,
wherein said RFID kernel tag is secured to said liner disk.

* * * * *